United States Patent [19]

Yasui

[11] Patent Number: 5,513,855

[45] Date of Patent: May 7, 1996

[54] METAL LAMINATE GASKET WITH ENGAGING DEVICE HAVING CURVED EDGES

[75] Inventor: Hisashi Yasui, Tokyo, Japan

[73] Assignee: Ishikawa Gasket Co., Ltd., Tokyo, Japan

[21] Appl. No.: 270,649

[22] Filed: Jul. 5, 1994

[51] Int. Cl.$^6$ ............................................................ F16J 15/08
[52] U.S. Cl. .............................................. 277/11; 277/235 B
[58] Field of Search ................................. 277/9–11, 235 B

[56] References Cited

U.S. PATENT DOCUMENTS

| | | | |
|---|---|---|---|
| 4,648,607 | 3/1987 | Yamanda et al. | 277/235 B |
| 4,776,601 | 10/1988 | Yamada | 277/235 B |
| 5,083,801 | 1/1992 | Okano et al. . | |
| 5,095,867 | 3/1992 | Inamura | 277/235 B |
| 5,096,325 | 3/1992 | Udagawa | 277/235 B |
| 5,154,529 | 10/1992 | Udagawa et al. | 277/235 B |
| 5,259,629 | 11/1993 | Udagawa | 277/235 B |
| 5,375,851 | 12/1994 | Mockenhaupt . | |

*Primary Examiner*—Scott W. Cummings
*Attorney, Agent, or Firm*—Kanesaka & Takeuchi

[57] ABSTRACT

A metal laminate gasket of the invention is formed of first and second metal plates laminating together. The first plate includes at least one first hole for receiving therein an engaging projection of an engine part, and a plurality of first engaging portions and first non-engaging portions alternately arranged to each other to define the first hole. The first engaging portions have first curved inner edges for forming a first imaginary hole with a diameter smaller than a diameter of the engaging projection. The second plate includes at least one second hole corresponding to and located above the first hole, and a plurality of second engaging portions and second non-engaging portions alternately arranged to each other to define the second hole. The second engaging portions have second curved inner edges for forming a second imaginary hole with a diameter smaller than the diameter of the engaging projection. When the gasket is placed on the engine part, the first and second engaging portions engage the engaging projection to prevent disengagement of the gasket from the engaging projection.

8 Claims, 1 Drawing Sheet

METAL LAMINATE GASKET WITH ENGAGING DEVICE HAVING CURVED EDGES

BACKGROUND OF THE INVENTION AND RELATED ART STATEMENT

The present invention relates to a metal laminate gasket for an internal combustion engine with an engaging device, such as a cylinder head gasket and a manifold gasket, which can be securely attached to dowels or bolts on an engine part.

When a cylinder head and a cylinder block are assembled together, the cylinder block is placed on a floor or a platform, and a gasket is placed on the cylinder block so that dowels formed on the cylinder block are located in dowel holes of the gasket. Then, the cylinder head is placed above the gasket, and the cylinder head and the cylinder block are tightened together by bolts.

In order to easily assemble the gasket on the cylinder block, the diameter or size of the dowel hole of the gasket may be made slightly larger than the diameter of the dowel. Therefore, in case the cylinder block with the gasket thereon is shaken, the gasket may disengage from the cylinder block.

Especially, in a V-type engine, gasket attaching surfaces of the cylinder block incline downwardly. Therefore, even if the gaskets are installed on the gasket attaching surfaces of the cylinder block, the gaskets may disengage from the cylinder block.

Similarly, in case a manifold gasket is installed in the cylinder head having bolts for fixing a manifold to the cylinder head, the manifold gasket is placed on the cylinder head such that the bolts engage bolt holes of the manifold gasket. When the cylinder head with the manifold gasket thereon is shaken, the manifold gasket may disengage from the bolts.

In an automatic assembly line for engines, the engines are continuously or consecutively moved. In some cases, the engine parts are stopped for a while for assembly, and then moved. In the automatic assembly line, it is troublesome to check the gasket in each engine, and to install a gasket in case no gasket is placed on the engine part.

In order to solve the above problems, there had been proposed U.S. Pat. No. 5,083,801, U.S. Pat. No. 5,095,867, U.S. Pat. No. 5,096,325, U.S. Pat. No. 5,154,529 and U.S. Pat. No. 5,259,629.

In U.S. Pat. No. 5,095,867, U.S. Pat. No. 5,096,325 and U.S. Pat. No. 5,154,529, it is required to use specific dowel pins. In U.S. Pat. No. 5,083,801 and U.S. Pat. No. 5,259,629, although no specific dowel pins are required, if the gasket is shaken strongly, the gasket may still disengage from the dowel pins or bolts.

Accordingly, one object of the present invention is to provide a metal laminate gasket having an engaging device, which does not accidentally disengage from the engine part even if the gasket is strongly shaken, and can be located at a proper position on the engine part.

Another object of the invention is to provide a metal laminate gasket as stated above, which can be easily installed on the engine without affecting sealing ability of the gasket.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the invention, a metal laminate gasket is designed to be easily and firmly engaged with an engaging projection, such as a dowel pin and a bolt, of an engine part. The gasket can be properly positioned and immovably placed on the engine part. The gasket does not accidentally disengage or fall from the engine part.

The gasket is basically formed of first and second metal plates piled and connected together. The first plate includes at least one first hole for receiving therein the engaging projection of the engine part, and a plurality of first engaging portions and first non-engaging portions alternately arranged to each other to define the first hole. The first engaging portions include first curved inner edges for forming a first imaginary hole with a diameter smaller than a diameter of the engaging projection. The first non-engaging portions are greater than the engaging projection.

The second plate is situated above the first plate. The second plate includes at least one second hole corresponding to and located above the first hole, and a plurality of second engaging portions and second non-engaging portions alternately arranged to each other to define the second hole. The second engaging portions include second curved inner edges for forming a second imaginary hole with a diameter smaller than the diameter of the engaging projection. The second non-engaging portions are greater than the engaging projection.

When the first and second plates are assembled, the first and second engaging portions are arranged not to completely overlap with each other. Namely, the first and second engaging portions may partly overlap with each other, or do not overlap completely. When the gasket is placed on and pushed against the engine part, the first and second engaging portions deform and engage the engaging projection to prevent disengagement of the gasket from the engaging projection.

In the invention, the first and second curved inner edges are formed concentrically to the engaging projection, and generally entirely, but not completely, surround the engaging projection. Thus, the gasket can snugly engage the engaging projection, and can be precisely located on the engine part. The first and second curved inner edges can securely hold the engaging projection.

The length of the first non-engaging portion between the two adjacent first engaging portions is greater than the length of the first curved inner edge of the first engaging portion, and the length of the second non-engaging portion between the two adjacent second engaging portions is greater than the length of the second curved inner edge of the second engaging portion.

The first and second imaginary holes may have different diameters. Also, the first curved inner edge may have a length different from that of the second curved inner edge. As a result, the holding strength of the first and second engaging portions can be changed and adjusted.

In case two engaging projections situated away from each other are formed on the engine part, the gasket can be placed in a proper position on the engine part. The position of the gasket is set by the engaging projections.

The first and second plates may be connected together in a conventional method, such as welding or grommet partly covering the first and second plates. In the gasket of the invention, one or more plate may be installed under the first plate, or above the second plate to form a metal laminate gasket with three or more plates.

DETAILED DESCRIPTION OF THE PREFERRED EMBODIMENTS

Referring to FIGS. 1–4, a first embodiment A of a metal laminate gasket of the invention is shown. The gasket A is a cylinder head gasket and is provided with a plurality of cylinder bores Hc, water holes Hw, oil holes Ho, bolt holes Hb, and positioning or dowel holes Hd, as in the conventional gasket. Since the present invention is directed to the structure of the dowel holes Hd, other structure and sealing mechanisms are not explained. Any structure and sealing mechanisms may be used.

Figure 1:
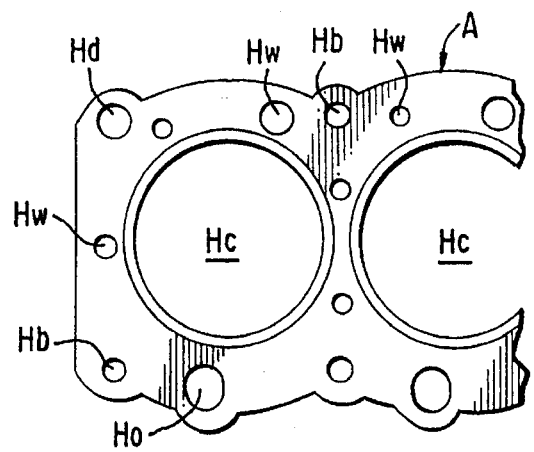
FIG. 1 is a plan view of a part of a first embodiment of a cylinder head gasket of the invention.
Figure 4:
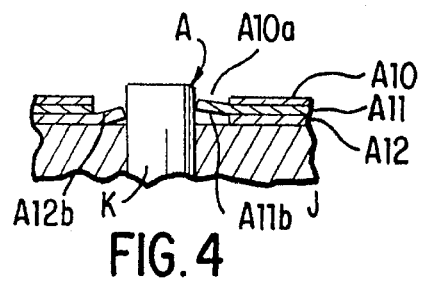
FIG. 4 is a section view taken along a line 3—3 in FIG. 2 for showing the gasket installed on a cylinder block.
Figure 2:
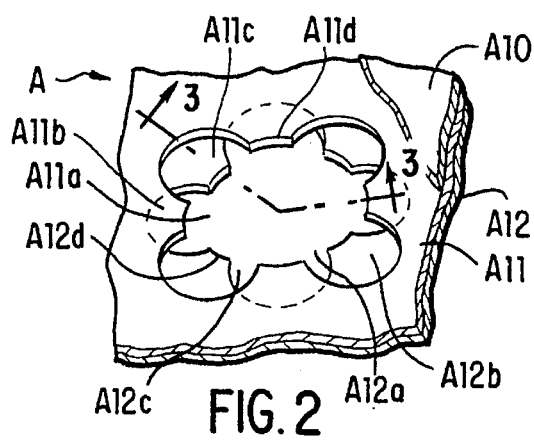
FIG. 2 is an enlarged perspective view of a dowel hole of the gasket of the invention.
Figure 3:
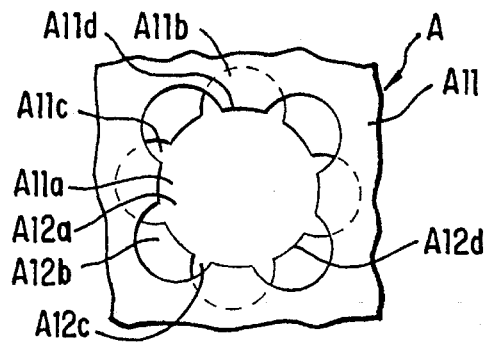
FIG. 3 is a plan view for showing the dowel hole of the first embodiment of the invention.

As shown in FIG. 4, the gasket A of the invention is designed to be installed on a cylinder block J with a dowel K. The dowel K has a cylindrical form and slightly projects upwardly from an upper surface of the cylinder block J. A bolt (not shown) passes through a hole of the dowel K to connect a cylinder head (not shown) to the cylinder block J.

The gasket A comprises an upper plate A10, a middle plate A11 and a lower plate A12, which extend substantially throughout the entire area of the engine. The upper plate A10 includes a hole A10a having a diameter larger than the diameter of the dowel K.

The middle plate A11 is situated under the upper plate A10 and includes a hole A11a defined by four engaging or projecting portions A11b and four non-engaging or recessed portions A11c. The engaging portions A11b include curved edges A11d forming an imaginary hole smaller than the diameter of the dowel K. The length of the curved edge A11d is smaller than the length at the non-engaging portion A11c, i.e. between the engaging portions A11b. The recessed portions A11c extend radially outwardly from the imaginary hole, so that the projecting portions A11b project to engage the dowel K.

The lower plate A12 is situated under the middle plate A11, and has the similar structure as in the middle plate A11. Namely, the lower plate A12 includes a hole A12a defined by four engaging or projecting portions A12b and four non-engaging or recessed portions A12c. The engaging portions A12b include curved edges A12d forming an imaginary hole smaller than the diameter of the dowel K. The length of the curved edge A12d is smaller than the length between the engaging portions A12b.

In the gasket A, the imaginary holes of the middle plate A11 and the lower plate A12 have the same diameters, and the engaging portions A11b, A12b and the non-engaging portions A11c, A12c have the same size. However, when the plates A10, A11, A12 are assembled, the engaging portions A12b are located under the non-engaging portions A11c so that the engaging portions A11b, A12b do not laminate together.

In the assembled condition, the plates A10, A11, A12 are connected together by spot welding (not shown). In case a grommet or a cover member for holding the upper and lower plates is used, the plates need not be connected together by the spot welding.

When the gasket A is installed on the cylinder block J, the gasket A is placed above the cylinder block J so that the dowel K aligns the dowel hole Hd formed of the holes A10a, A11a, A12a. Then, the gasket A is strongly pushed against the cylinder block J. As a result, the projecting portions A11b, A12b are bent upwardly to allow the dowel K to enter into the hole Hd.

Since the hole A10a of the upper plate A10 is larger than the diameter of the dowel K, when the engaging portions A11b are bent, the engaging portions A11b are urged to partly locate inside the hole A10a. The engaging portions A11b do not project beyond the upper surface of the upper plate A10. Also, the engaging portions A12b are bent to be located in the non-engagement portions A11c.

In the gasket A, the curved edges A11d, A12d are formed concentrically to the dowel K, and generally completely surround the dowel K though small spaces are formed therearound. Thus, when the engaging portions A11b, A12b are bent and engage the dowel K, the curved edges A11d, A12d securely hold the dowel K.

Generally, two dowels are formed on the cylinder block J. When the dowels K enter into the dowel holes Hd, the gasket A does not move and is properly positioned on the cylinder block J.

Figure 5:
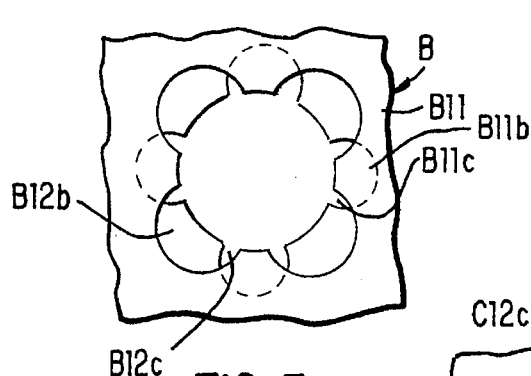
FIG. 5 is an enlarged plan view for showing the dowel hole of a second embodiment of the invention.

FIG. 5 shows a second embodiment B of the gasket of the invention. The gasket B is a cylinder head gasket, and is formed of an upper plate B10 (not shown), a middle plate B11 having engaging portions B11b and non-engaging portions B11c, and a lower plate B12 having engaging portions B12b and non-engaging portions B12c, as in the gasket A.

However, in the gasket B, the sizes of the engaging portions and the non-engaging portions of the plates B11, B12 are different. Namely, in the plate B11, the sizes of the engaging portions B11b are smaller than those of the non-engaging portions B11c, while the sizes of the engaging portions B12b are substantially the same as those of the non-engaging portion B12c. The rest of the structure of the gasket B is the same as in the gasket A.

In the gasket B, although the engaging portions B12b is greater than the engaging portions B11b, the gasket B operates as in the gasket A. The gasket B does not accidentally disengage from the cylinder block J.

Figure 6:
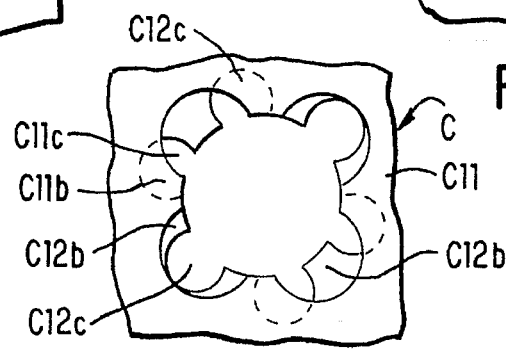
FIG. 6 is an enlarged plan view for showing the dowel hole of a third embodiment of the invention.

FIG. 6 shows a third embodiment C of the gasket of the invention. The gasket C is a cylinder head gasket and is formed of an upper plate C10 (not shown), a middle plate C11 having engaging portions C11b and non-engaging portions C11c, and a lower plate C12 having engaging portions C12b and non-engaging portions C12c.

In the gasket C, the middle plate C11 has four engaging portions and non-engaging portions, while the lower plate C12 has six engaging portions and non-engaging portions. The sizes of the engaging portions C11b are substantially the same as the diameter of the dowel as those of the engaging portions C12b, wherein the two engaging portions C12b are located under the two non-engaging portions C11c.

In the gasket C, some of the engaging portions C12b partly overlap some of the engaging portions C11b. However, the gasket C operates as in the gasket A.

Figure 7:
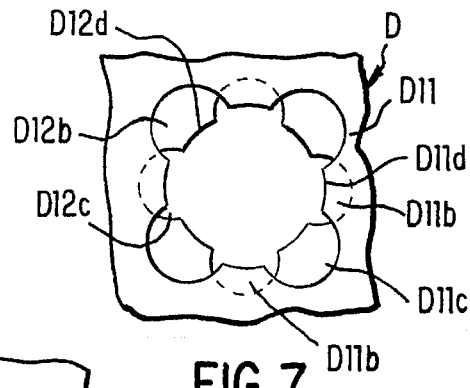
FIG. 7 is an enlarged plan view for showing the dowel hole of a fourth embodiment of the invention.

FIG. 7 shows a fourth embodiment D of the gasket of the invention. The gasket D is formed of an upper plate D10 (not shown), a middle plate D11 having engaging portions D11b and non-engaging portions D11c, and a lower plate D12 having engaging portions D12b and non-engaging portions D12c.

In the gasket D, the size of an imaginary hole for defining curved edges D11d of the engaging portions D11b is larger than that for curved edges D12d of the engaging portions D12b, though it is smaller than the diameter of the dowel K. When the gasket D is engaged with the dowel K, the engaging portions D11b are slightly bent. Thus, the force applied from the curved edges D11d, D12d to the dowel K is different. The gasket D can securely engage the dowel.

In the gaskets B–D, the sizes or shapes of the engaging portions in the middle and lower plates are different. Thus, the bending strength of the engaging portions and forces applied to the dowel when installed are different. These structures are especially useful in case the middle and lower plates are made of different plates, i.e. strength, thickness, quality and so on. The desired sizes or shapes of the engaging portions are selected based on the requirement of the gasket.

In the metal laminate gasket of the present invention, the two plates include the engaging portions having curved edges concentrically to the dowel and generally surrounding the dowel. When the gasket is pushed over the engaging projection, i.e. dowel or bolt, the engaging portions are bent to securely engage the gasket to the engine part. Since the engaging portions securely engage the dowel or bolt, even if the engine part is transferred in an assembly line, the gasket does not accidentally disengage from the engine part.

While the invention has been explained with reference to the specific embodiments of the invention, the explanation is illustrative, and the invention is limited only by the appended claims.

What is claimed is:

1. A metal laminate gasket adapted to be engaged with an engaging projection of an engine part for immovably locating the gasket on the engine part, comprising, a first metal plate including at least one first hole for receiving therein the engaging projection of the engine part, and a plurality of first engaging portions and first non-engaging portions alternately arranged to each other to define the first hole, said first engaging portions having first curved inner edges for forming a first imaginary hole with a diameter smaller than a diameter of the engaging projection, said first non-engaging portions having a size greater than the engaging projection, a length of the first non-engaging portion between two adjacent first engaging portions being greater than a length of the first curved inner edge of the first engaging portion, and a second metal plate situated above the first plate, said second plate including at least one second hole corresponding to and located above the first hole, and a plurality of second engaging portions and second non-engaging portions alternately arranged to each other to define the second hole, said second engaging portions having second curved inner edges for forming a second imaginary hole with a diameter smaller than the diameter of the engaging projection, said second non-engaging portions having a size greater than the engaging projection, a length of the second non-engaging portion between two adjacent second engaging portions being greater than a length of the second curved inner edge of the second engaging portion, said first and second engaging portions, when the first and second plates are assembled, being arranged not to completely overlap with each other so that when the gasket is placed on the engine part, the first and second engaging portions engage the engaging projection to prevent disengagement of the gasket from the engaging projection.

2. A metal laminate gasket according to claim 1, wherein at least two first engaging portions are located under the second non-engaging portions.

3. A metal laminate gasket according to claim 2, wherein said first and second engaging portions are arranged alternately not to overlap with each other to generally surround the engaging projection.

4. A metal laminate gasket according to claim 1, wherein said first and second imaginary holes have equal diameters.

5. A metal laminate gasket according to claim 1, wherein said first curved inner edge has a length greater than that of the second curved inner edge.

6. A metal laminate gasket according to claim 1, wherein said first and second imaginary holes have different diameters.

7. A metal laminate gasket according to claim 2, wherein said first and second engaging portions are arranged to partly overlap with each other.

8. A metal laminate gasket adapted to be engaged with an engaging projection of an engine part for immovably locating the gasket on the engine part, comprising, a first metal plate including at least one first hole for receiving therein the engaging projection of the engine part, and a plurality of first curved engaging portions and first curved non-engaging portions alternately arranged to each other to define the first hole, said first curved engaging portions having first curved inner edges for forming a first imaginary hole with a diameter smaller than a diameter of the engaging projection, and said first curved non-engaging portions having a size greater than the engaging projection, and a second metal plate situated above the first plate, said second plate including at least one second hole corresponding to and located above the first hole, and a plurality of second curved engaging portions and second curved non-engaging portions alternately arranged to each other to define a second hole, said second curved engaging portions having second curved inner edges for forming a second imaginary hole with a diameter smaller than the diameter of the engaging projection, said second curved non-engaging portions having a size greater than the engaging projection, each of said first and second curved non-engaging portions having a curvature extending in the direction radially outwardly from a center of each curved non-engaging portion to provide a narrow width for each curved engaging portion sandwiched between two curved non-engaging portions, said first and second curved engaging portions, when the first and second plates are assembled, being arranged not to completely overlap with each other so that when the gasket is placed on the engine part, the first and second curved engaging portions are easily bent and engage the engaging projection to prevent disengagement of the gasket from the engaging projection.

* * * * *